(12) United States Patent
Lannutti

(10) Patent No.: US 9,291,217 B2
(45) Date of Patent: Mar. 22, 2016

(54) PULLEY ASSEMBLY WITH RADIALLY ORIENTED DECOUPLING MECHANISM

(71) Applicant: Anthony Eugene Lannutti, Fayetteville, AR (US)

(72) Inventor: Anthony Eugene Lannutti, Fayetteville, AR (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 94 days.

(21) Appl. No.: 14/247,323

(22) Filed: Apr. 8, 2014

(65) Prior Publication Data

US 2015/0285317 A1    Oct. 8, 2015

(51) Int. Cl.
| | |
|---|---|
| *F16D 41/06* | (2006.01) |
| *F02B 61/00* | (2006.01) |
| *F02B 63/00* | (2006.01) |
| *F16D 41/066* | (2006.01) |
| *F16D 23/12* | (2006.01) |

(52) U.S. Cl.
CPC .............. *F16D 41/06* (2013.01); *F02B 61/00* (2013.01); *F02B 63/00* (2013.01); *F16D 41/066* (2013.01); *F16D 2023/123* (2013.01); *F16D 2041/0665* (2013.01)

(58) Field of Classification Search
CPC ........... F16D 1/08; F16D 1/0876; F16D 3/06; F16D 3/065; F16D 3/12; F16D 15/00; F16D 41/00; F16D 41/06; F16D 41/061; F16D 41/063; F16D 41/064; F16D 41/066; F16D 41/086; F16D 2041/0603; F16D 2041/0646; F16D 45/00; F16D 47/04; F16D 2127/10; F02B 61/00; F02B 63/00; F02B 67/06; F16H 55/36; F16H 2055/366
See application file for complete search history.

(56) References Cited

U.S. PATENT DOCUMENTS

| | | | |
|---|---|---|---|
| 2,866,349 A | 12/1958 | Heckethorn | |
| 3,129,797 A | 4/1964 | Orcutt et al. | |
| 3,618,730 A | 11/1971 | Mould, III | |
| 4,550,817 A | 11/1985 | Euler | |
| 4,725,260 A | 2/1988 | Komorowski et al. | |
| 4,826,471 A | 5/1989 | Ushio | |
| 4,989,704 A * | 2/1991 | Morishita ............. | F16D 41/066 192/41 R |

(Continued)

FOREIGN PATENT DOCUMENTS

| | | |
|---|---|---|
| EP | 0803030 | 12/2000 |
| EP | 0980479 | 8/2003 |

(Continued)

OTHER PUBLICATIONS

"Learn About Torsion Springs" by Lee Spring Company (2011).

(Continued)

*Primary Examiner* — Jacob S Scott
(74) *Attorney, Agent, or Firm* — Thompson Hine LLP

(57) ABSTRACT

A pulley assembly with a radially oriented decoupling mechanism is disclosed. The pulley assembly includes a pulley body having a bore therethrough, a hub, and a one-way clutch mechanism. The pulley body is rotatable in a predominate direction. The hub defines an axis of rotation. The hub is disposed within the pulley body. The one-way clutch mechanism radially surrounds the hub. The one way clutch mechanism includes an engaged position and a disengaged position. The hub and the pulley body rotate together in the predominate direction if the one-way clutch mechanism is in the engaged position. The hub freely rotates with respect to the pulley body if the one-way clutch mechanism is in the disengaged position.

17 Claims, 6 Drawing Sheets

(56) References Cited

U.S. PATENT DOCUMENTS

| | | | |
|---|---|---|---|
| 5,012,905 A | 5/1991 | Tanaka | |
| 5,156,573 A | 10/1992 | Bytzek et al. | |
| 5,234,089 A * | 8/1993 | Itomi | F16D 7/022 192/48.92 |
| 5,435,201 A | 7/1995 | Preston et al. | |
| 5,469,948 A | 11/1995 | Organek et al. | |
| 5,485,904 A | 1/1996 | Organek et al. | |
| 5,638,931 A | 6/1997 | Kerr | |
| 5,680,921 A | 10/1997 | Vierk et al. | |
| 5,810,141 A | 9/1998 | Organek et al. | |
| 5,928,083 A | 7/1999 | Monahan et al. | |
| 6,083,130 A | 7/2000 | Mevissen et al. | |
| 6,464,057 B2 | 10/2002 | Ouchi | |
| 6,488,135 B1 | 12/2002 | Kinoshita | |
| 6,561,332 B2 | 5/2003 | Organek et al. | |
| 6,637,569 B1 | 10/2003 | Organek et al. | |
| 6,666,315 B2 | 12/2003 | Organek et al. | |
| 6,691,851 B2 | 2/2004 | Liu et al. | |
| 6,964,326 B2 | 11/2005 | Kamping | |
| 7,503,443 B1 | 3/2009 | Dobras | |
| 7,591,357 B2 | 9/2009 | Antchak et al. | |
| 7,618,337 B2 | 11/2009 | Jansen et al. | |
| 7,712,592 B2 | 5/2010 | Jansen et al. | |
| 7,766,774 B2 | 8/2010 | Antchak et al. | |
| 7,931,552 B2 | 4/2011 | Pendergrass et al. | |
| 7,975,821 B2 | 7/2011 | Antchak et al. | |
| 7,998,008 B2 | 8/2011 | Kamdem et al. | |
| 8,021,253 B2 | 9/2011 | Dell et al. | |
| 8,038,555 B2 | 10/2011 | Pendergrass et al. | |
| 8,047,920 B2 | 11/2011 | Jansen et al. | |
| 8,132,657 B2 | 3/2012 | Antchak et al. | |
| 8,727,089 B2 * | 5/2014 | Yang | F16D 43/10 192/103 R |
| 9,033,832 B1 * | 5/2015 | Serkh | F16H 55/36 474/70 |
| 2005/0056100 A1 | 3/2005 | Yuan et al. | |
| 2005/0288136 A1 | 12/2005 | Lorenz | |
| 2007/0066426 A1 | 3/2007 | Kamdem et al. | |
| 2009/0176608 A1 | 7/2009 | Jansen et al. | |
| 2009/0272618 A1 | 11/2009 | Pendergrass et al. | |
| 2010/0072017 A1 | 3/2010 | Joki et al. | |
| 2010/0113201 A1 | 5/2010 | Lannutti | |
| 2010/0140044 A1 | 6/2010 | Antchak et al. | |
| 2010/0275711 A1 | 11/2010 | Shige et al. | |
| 2011/0015018 A1 | 1/2011 | Yamatani et al. | |
| 2012/0000446 A1 | 1/2012 | Venton-Walters et al. | |
| 2013/0049187 A1 | 2/2013 | Minamio et al. | |
| 2013/0161150 A1 | 6/2013 | McCrary | |
| 2013/0220759 A1 * | 8/2013 | Schoolcraft | F16D 41/086 192/44 |
| 2013/0237351 A1 | 9/2013 | Marion | |

FOREIGN PATENT DOCUMENTS

| | | |
|---|---|---|
| EP | 1764524 | 3/2007 |
| EP | 1772644 | 4/2007 |
| EP | 1590575 | 4/2010 |
| EP | 1692409 | 7/2010 |
| EP | 2258968 | 12/2010 |
| EP | 1844245 | 4/2013 |
| JP | 2005-163932 | 6/2005 |
| JP | 2006-329407 | 12/2006 |
| JP | 2010-127369 | 6/2010 |
| JP | 2010-127370 | 6/2010 |
| JP | 2011-169397 | 9/2011 |
| WO | 2010/050408 | 5/2010 |
| WO | 2010/061805 | 6/2010 |
| WO | 2012/061936 | 5/2012 |

OTHER PUBLICATIONS

International Search Report and Written Opinion, PCT/US2012/069386 (Feb. 26, 2013).
PCT, International Search Report and Written Opinion, Int'l. Appln. No. PCT/US2015/022355, dated Jun. 29, 2015.
US, Office Action, U.S. Appl. No. 13/713,247, dated Dec. 23, 2014.
US, Office Action, U.S. Appl. No. 13/713,247, dated Jul. 16, 2015.

* cited by examiner

PULLEY ASSEMBLY WITH RADIALLY ORIENTED DECOUPLING MECHANISM

TECHNICAL FIELD

The present invention relates generally to pulleys, and more particularly to a pulley assembly with a radially oriented decoupling mechanism.

BACKGROUND

Various automobile accessory assemblies including, for example, a water pump, an alternator/generator, a fan for cooling coolant, a power steering pump, and a compressor, may be driven using the vehicle engine. In particular, a driving pulley actuated by an engine shaft of the motor vehicle drives an endless drive belt that in turn drives the accessory assemblies through driven pulleys. The endless drive belt, the various pulleys, and a tensioner pulley assembly may be referred as an accessory drive system.

Periodic torque pulses initiated by, for example, combustion engine tiring may create significant speed transitions. These speed transitions may interrupt smooth operation of the driven components of the accessory drive system. In addition, inertial and driven speed transitions associated with startup, shutdown, and gear shifting may also interrupt operation of the driven components. These transitions can result in undesirable effects such as, but not limited to, endless belt jump, endless belt wear, bearing wear, and noise.

Overrunning alternator decouplers (OADs) may be used to dampen torque variations and speed transitions. An OAD is installed on the alternator of the accessory drive system, as the alternator usually has the highest inertial load of the accessories driven by the endless drive belt. The OAD has decoupling capabilities, and also provides torsional isolation to the alternator. By decoupling larger inertial components from the system, such as the alternator, issues such as endless belt wear, endless belt noise, bearing life, and movement of a tensioner arm may be improved.

Although OADs may improve noise as well as the life of the various components of the accessory drive system, several drawbacks currently exist. For example, OADs may introduce additional cost due to part complexity and packaging space in an accessory assembly. This makes it challenging to use un OAD in some applications. Moreover, some types of OADs may be especially susceptible to contamination or heat. Finally, some types OADs may have issues with noise, torque consistency, low hysteresis, or smooth spring rate.

SUMMARY

An improved pulley assembly is disclosed that utilizes an internal decoupler system to permit one-way relative motion between an input shaft of a driven accessory such as, for example, an alternator and an outer driven sheave of the pulley assembly. The disclosed pulley system may also be used to permit one-way relative motion between a crank shaft and an outer drive sheave of the pulley assembly.

For a driven pulley assembly, when the sheave of the pulley assembly is being driven in a predominate direction of rotation, a clutching mechanism of the pulley assembly engages and drives the accessory input shaft. When relative torque reversals occur as a result of, for example, driven speed transitions, the internal clutching mechanism of the disclosed pulley assembly disengages the driven accessory shaft from the outer driven sheave, thereby permitting the driven shaft to continue to rotate with momentum in the predominate direction of rotation even at speeds greater than the driven sheave of the pulley.

For a driver pulley assembly, when the hub of the pulley, which is coupled to a crank shaft, is rotated in the predominate direction of rotation, the clutching mechanism of the pulley assembly engages and drives a sheave of the pulley assembly. When relative torque reversals occur as a result of, for example, crank shaft speed transitions, the internal clutching mechanism of the disclosed pulley assembly disengages the sheave of the pulley assembly from the crank shaft, thereby permitting the sheave of the pulley to continue to rotate with momentum in the predominate direction of rotation even at speeds greater than the crank shaft.

In one embodiment, the pulley assembly includes a pulley body having a bore therethrough, a hub, and a one-way clutch mechanism. The pulley body is rotatable in a predominate direction. The hub defines an axis of rotation. The hub is disposed within the pulley body. The one-way clutch mechanism radially surrounds the hub. The one way clutch mechanism includes an engaged position and a disengaged position. The hub and the pulley body rotate together in the predominate direction if the one-way clutch mechanism is in the engaged position. The hub freely rotates with respect to the pulley body if the one-way clutch mechanism is in the disengaged position. The engaged position links the hub to the pulley body for simultaneous rotation in the predominant direction. Then, when the pulley body rotates in a direction opposite the predominate direction or experiences a deceleration, the clutch mechanism disengages from the actuator and allows the hub to rotate independently of the pulley body, still, in the predominant direction under its own momentum. In other words, the pulley assembly enters an overrun position where the clutch mechanism disengages from the actuator and allows the hub to rotate at speeds greater than the pulley body.

In one embodiment, the pulley assembly includes a clutch actuator disposed around the hub. The clutch actuator includes an upper ramp component and a lower ramp component. The upper ramp component and the lower ramp component expand axially with respect to one another if the pulley body rotates in the predominate rotational direction.

DETAILED DESCRIPTION

Figure 1:
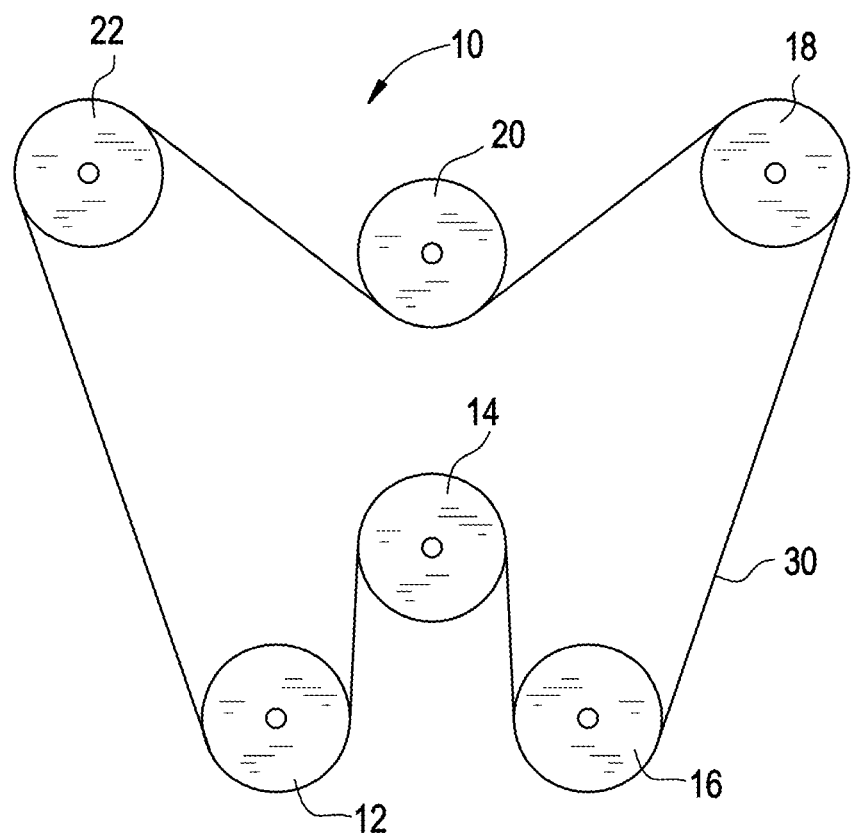
FIG. 1 is a diagrammatic view of an embodiment of an accessory drive system.

The following detailed description will illustrate the general principles of the invention, examples of which are additionally illustrated in the accompanying drawings. In the drawings, like reference numbers indicate identical or functionally similar elements.

Referring now to FIG. 1, an accessory drive system 10 of, for example, an internal combustion engine of a vehicle is illustrated. The accessory drive system 10 includes an endless belt 30 that is used to drive a number of accessories, which are not illustrated in FIG. 1. Instead, the accessories are represented in FIG. 1 diagrammatically by a number of pulley assemblies. Specifically, FIG. 1 illustrates the belt 30 entrained around a crank pulley assembly 12, a fan/water pump pulley assembly 14, an alternator pulley assembly 16, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of the pulley assemblies 14, 16, 18, 20 and 22 that are themselves rotated by the belt 30. For purposes of description, the alternator pulley assembly 16 will be focused on below. Although the alternator pulley assembly 16 is described below, those skilled in the art will appreciate that the other pulley assemblies 12, 18, 20, and 22 may also operate in a fashion similar to that of the alternator pulley assembly 16.

Figure 2:
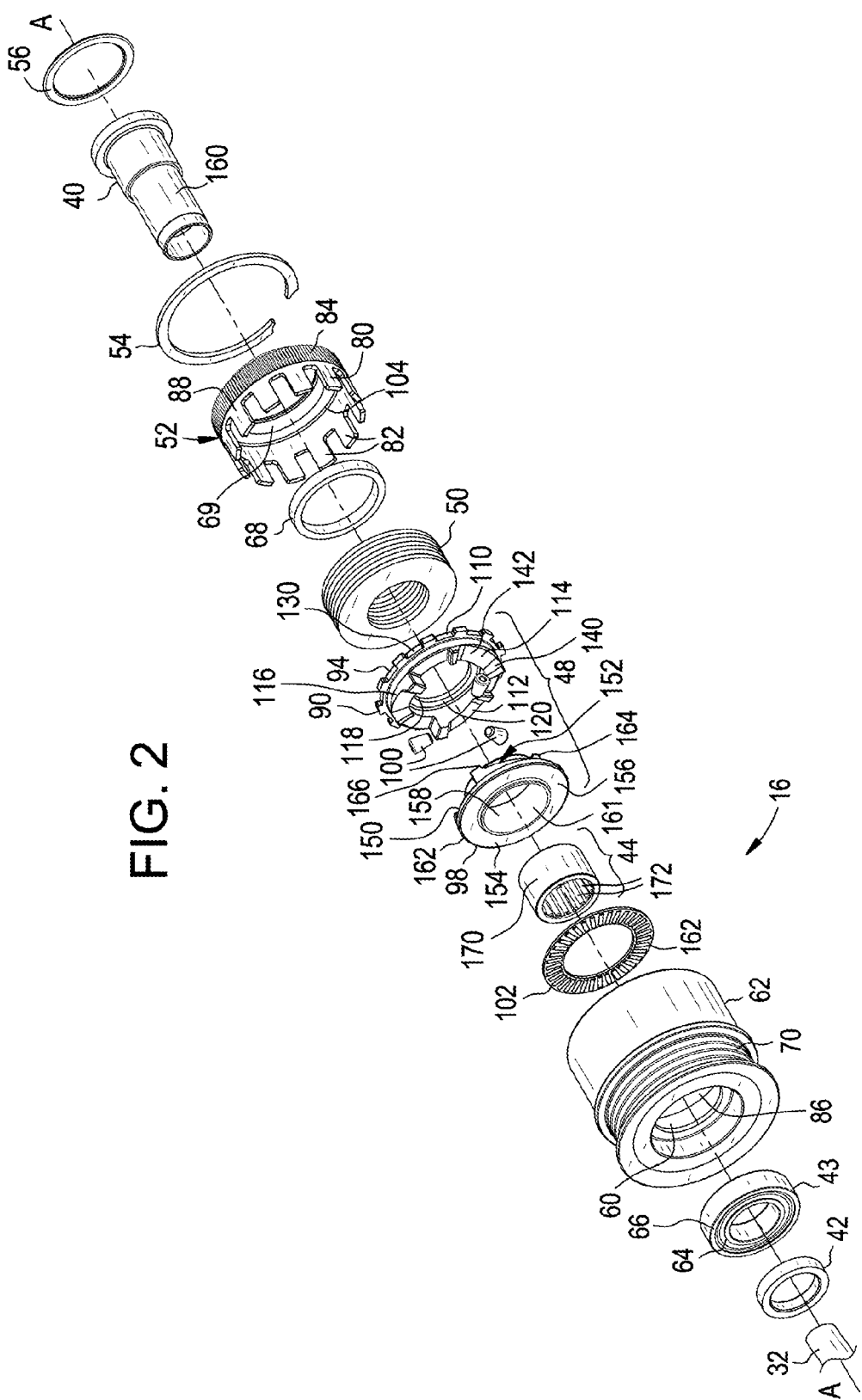
FIG. 2 is an exploded, perspective view of an embodiment of a pulley assembly for use in an accessory drive system such as that illustrated in FIG. 1.
Figure 3:
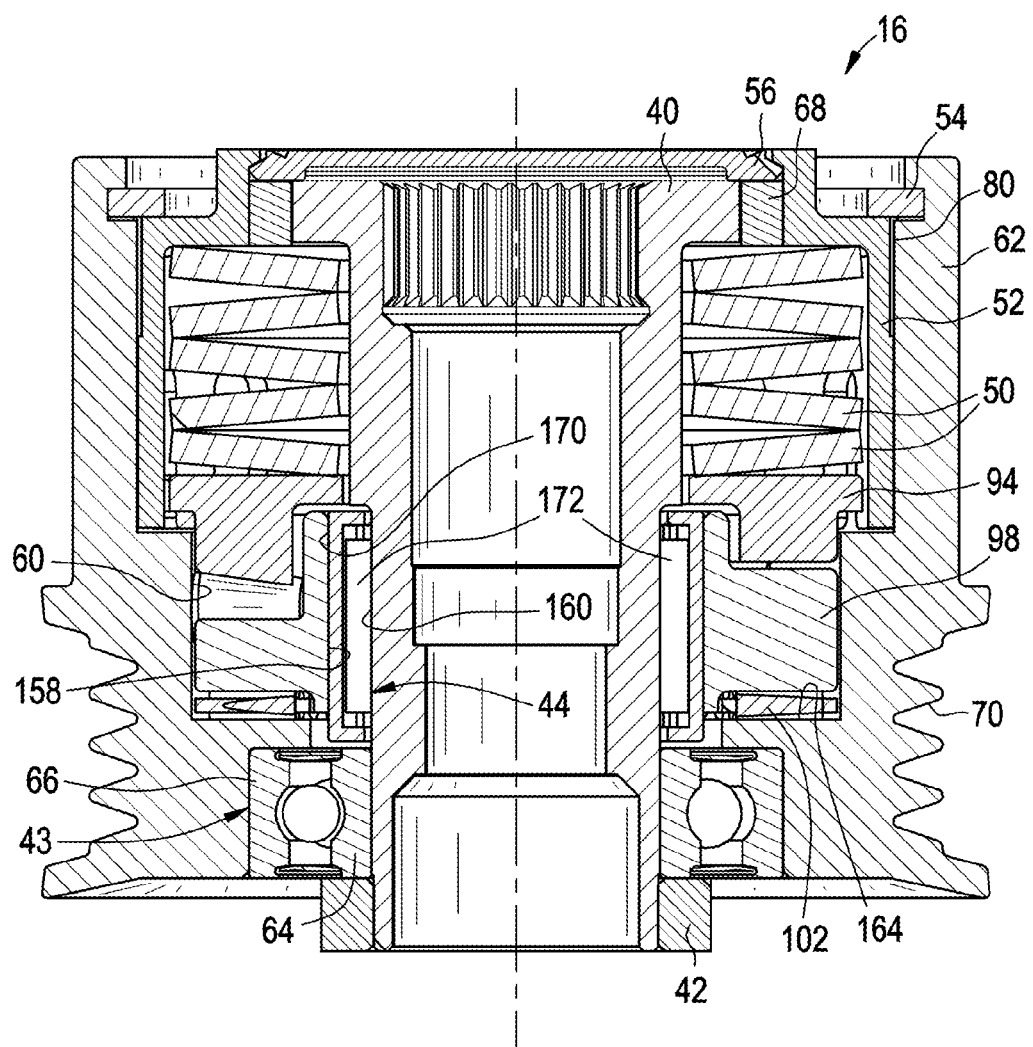
FIG. 3 is a side, cross-sectioned view of the pulley assembly of FIG. 2.

Referring now to FIGS. 2 and 3, the alternator pulley assembly 16 may be used to transfer input torque from the belt 30 (shown in FIG. 1) to an input shaft 32 of an accessory (e.g., the alternator) when the alternator pulley assembly 16 is rotated in a predominate rotational direction. The alternator pulley assembly 16 also isolates the input shaft 32 from relative torque reversals. Specifically, when relative torque reversals between the alternator pulley assembly 16 and the input shaft 32 occur, an internal decoupler system of the alternator pulley assembly 16 acts to disengage the input shaft 32 from the torque reversal, thereby permitting the input shaft 32 to continue rotating with momentum in the predominate rotational direction. The torque reversal may also be referred to as an overrunning condition.

The pulley assembly 16 includes a hub 40 that is engageable with the input shaft 32, a spacer 42, a roller bearing 43, a one-way clutch mechanism 44, a clutch actuator 48, one or more biasing members 50, a sleeve 52, a retaining ring 54, and a plug 56, which are all housed within a bore 60 of a pulley body 62. The hub 40 may be mated to the input shaft 32 so as to prevent the hub 40 from freely rotating about the input shaft 32. The hub 40 may be mated to the input shaft 32 using any known approach for allowing torque transmission between two rotational elements such as, for example, a Woodruff key (not illustrated). The roller bearing 43 may include an inner race 64 and an outer race 66. As seen in FIG. 3, the roller bearing 43 may be located between the hub 40 and the pulley body 62.

As illustrated in FIGS. 2 and 3, the pulley body 62 surrounds the hub 40, and the pulley bore 60 is sized such that the pulley body 62 may rotate about the hub 40. The pulley body 62 also includes an outer, peripheral belt-engaging surface 70 that engages the belt 30 (FIG. 1). The belt engaging surface 70 may be profiled including V-shaped ribs and grooves to mate with corresponding ribs and grooves (not illustrated) on the belt 30. Although FIGS. 2-3 illustrate V-shaped ribs located along the belt engaging surface 70, other features such as cogs, flat or rounded ribs and grooves may be used as well to engage the belt 30.

The roller bearing 43 may support a portion of the force exerted by the endless belt 30 (shown in FIG. 1) upon the pulley body 62. A bushing 68, which is press-fit into a recess 69 located within the sleeve 52, may be used to support the remaining force exerted by the endless belt 30 that is not supported by the roller bearing 43. However, it should be noted that if the roller bearing 43 is aligned with the belt 30, then the roller bearing 43 may support the entire force exerted by the endless belt 30, and the bushing 68 may be omitted. The inner race 64 of the roller bearing 43 may be adjacent and coupled to the hub 40. The outer race 66 of the roller bearing 43 may be adjacent and coupled to the pulley body 62. The roller bearing 43 may improve the overall structural rigidity of the pulley assembly 16.

Referring to FIG. 2, the sleeve 52 may include an outer surface 80 and a series of axially extending engagement features 82. In the embodiment as shown in FIG. 2, a portion of the outer surface 80 of the sleeve 52 may be knurled, and is illustrated as knurled surface 84. The knurled surface 84 of the sleeve 52 may grip or frictionally engage with an inner surface 86 of the pulley body 62, thereby fixing the sleeve 52 with the pulley body 62 for rotation therewith. In the exemplary embodiment as shown in FIG. 2, the engagement features 82 of the sleeve 52 may be a series of equally spaced, axially extending tabs that are located around the entire circumference 88 of the sleeve 52. The engagement features 82 may be configured to radially engage with a set of retaining features 90 located on an upper ramp component 94. The engagement of the sleeve 52 with the upper ramp component 94 is described in greater detail below. Although FIG. 2 illustrates the engagement features 82 as a series of equally spaced tabs extending around the entire circumference 88 of the sleeve 52, it is to be understood that other configurations may be used as well to engage the upper ramp component 94.

Figure 6:
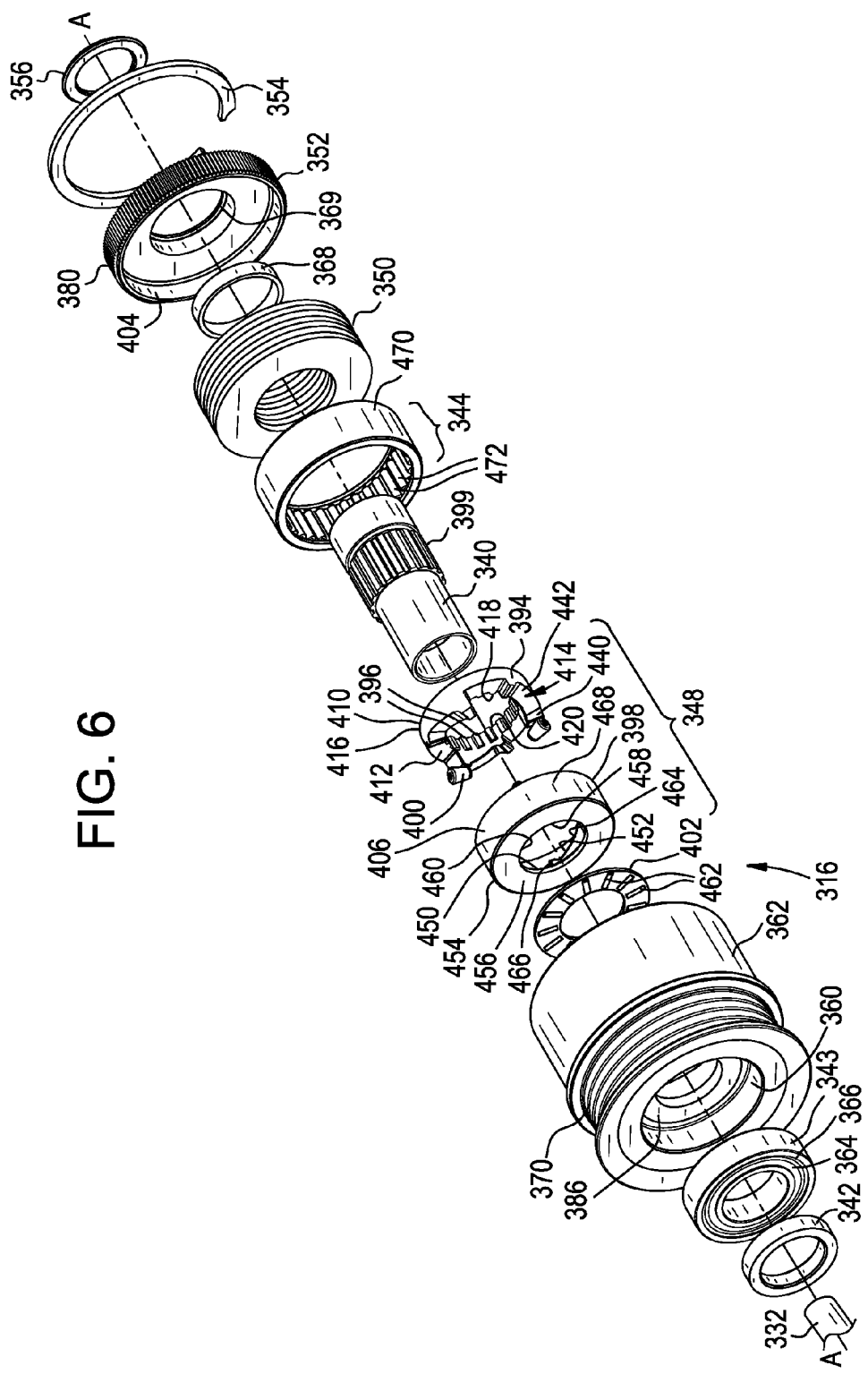
FIG. 6 is an exploded, perspective view of an alternative embodiment of a pulley assembly for use in an accessory drive system such as that illustrated in FIG. 1.
Figure 7:
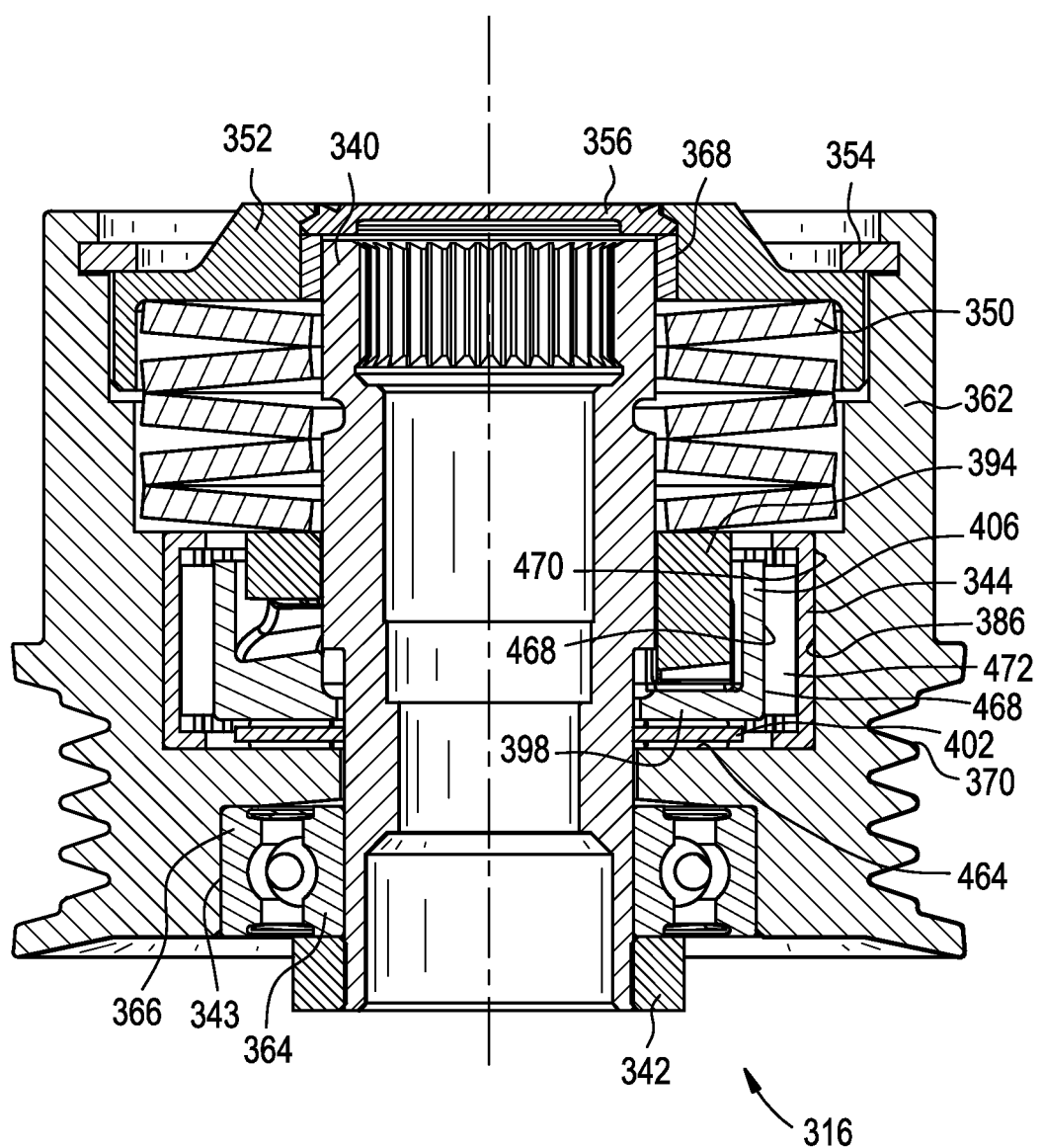
FIG. 7 is a side, cross-sectioned view of the pulley assembly of FIG. 4.

In the exemplary embodiment as shown in FIG. 2, the clutch actuator 48 may include a ramp construction or a roller-ramp construction that expands axially (i.e., has at least one component that is translatable along an axis of rotation A-A of the alternator pulley assembly 16 to a location further from another component thereof) as a result of rotational movement of at least a portion of the clutch actuator 48. The axial expansion typically is a result of one component moving up or along an inclined feature or moving in response to the movement of a rolling element up or along an inclined feature. The clutch actuator 48 in the embodiment of FIGS. 2 and 3 includes the upper ramp component 94, a lower ramp component 98, and a roller element 100 enclosed therebetween. The roller elements 100 may be cylinders, balls, generally conical cylinders, or the like. Upper and lower are used herein as relative to positions of the components of the pulley assembly 16 as illustrated in FIG. 3 with respect to the orientation of the page. The terms upper and lower are likewise applicable to the other drawings herein. In the embodiment as shown in FIGS. 2-3, the upper ramp component 94 drives the lower ramp component 98. However, it is to be understood that in other embodiments, the lower ramp component 98 may be the driving member. For example, in the embodiment as shown in FIGS. 6-7, a lower ramp component 398 drives an upper ramp component 394.

The upper ramp component 94 is generally located adjacent to the biasing members 50. In the nonlimiting embodiment as shown in FIGS. 2-3, the biasing members 50 are illustrated as a plurality of Belleville washers. However, it is to be understood that any type of biasing member configured to exert a force in an axial direction and against the upper ramp component 94 may be used as well such as, for example, a wave or spiral compression spring. The biasing members 50 may be housed within a recess 104 defined by the sleeve 52. The engagement features 82 of the sleeve 52 extend axially along the axis of rotation A-A, and create a corral that contains the upper ramp component 94.

The upper ramp component 94 may include a generally smooth upper surface 110, a lower surface 112 comprising one or more first inclined features 114 that are recessed into a body 116 of the upper ramp component 94, and an inner surface 118 defining a bore 120 for receiving the hub 40. The upper ramp component 94 also includes an outer circumferential surface 130, where the retaining features 90 are located along the outer circumferential surface 130. In the non-limiting embodiment as shown in FIG. 2, the retaining features 90 may be one or more outwardly projecting tabs. When the pulley assembly 16 is assembled shown in FIG. 3) the upper ramp component 94 is coupled to the sleeve 52 by engaging the retaining features 90 of the upper ramp component 94 with the engagement features 82 of the sleeve 52. Specifically, each outwardly projecting tab of the upper ramp component 94 may be radially engaged between two of the axially extending tabs located on the sleeve 52. Accordingly, the upper ramp component 94 is fixed to the sleeve 52 and the pulley body 62 for rotation therewith. However, the upper ramp component 94 may translate axially with respect to the axis A-A. The pulley assembly 16 is constructed such that when the upper ramp component 94 translates relative to the pulley body 62, the retaining features 90 of the upper ramp component 94 and the engagement features 82 of the sleeve 52 provide frictional contact therebetween. Lower contact pressures may be desirable for smooth ramp activation, and lower spring hysteresis.

Referring to FIG. 2, the first inclined features 114 of the upper ramp component 94 define a channel within which one of the roller elements 100 may be seated. The channel has a first end 140 that is shallow relative to a second end 142 (i.e., the second end 142 is recessed more deeply into the body 116 of the upper ramp component 94). For smooth angular displacement of the upper ramp component 94 (and rotation of the roller element 100) the channel smoothly and gradually tapers from the first end 140 to the second end 142.

The lower ramp component 98 is located between the upper ramp component 94 and a thrust bearing 102. The lower ramp component 98 has an upper surface 150 comprising one or more second inclined features 152 recessed into a body 154 of the lower ramp component 98, a generally smooth lower surface 156, an inner surface 158 defining a bore 161, and a generally smooth outer circumferential surface 162. The bore 161 of the lower ramp component 98 receives the one-way clutch mechanism 44. The thrust bearing 102 may be seated between the lower surface 156 of the lower ramp component 98 and an inner surface 164 of the pulley body 62 (shown in FIG. 3). In one non-limiting embodiment, the thrust bearing 102 may be a needle roller-type thrust bearing including a plurality of generally cylindrical roller elements 162. The thrust bearing 102 allows for relative rotation between the lower ramp component 98 and the pulley body 62. It should be noted that while FIG. 2 illustrates the clutch actuator 48 as having a ramp construction with roller elements, those skilled in the art will readily appreciate that the clutch actuator 48 may include any type of configuration that enables axial expansion between the lower ramp component and the upper ramp component if the pulley body 62 rotates in the predominate rotational direction. For example, in one embodiment the clutch actuator 62 may include a ball-ramp, cam follower, or ball screw unit.

Referring to FIG. 2, the second inclined features 152 of the lower ramp component 98 may be similarly constructed to those in the upper ramp component 94, except that an orientation of a first end 164 and a second end 166 of the second inclined features 152 may be reversed relative to the orientation of the first and second ends 140, 142 of the first inclined features 114. The roller elements 100 may be received within the first inclined feature 114 of the upper ramp component 94 and second inclined feature 152 of the lower ramp component 98. Thus, as the pulley body 62 rotates in the predominate rotational direction, the upper ramp component 94 drives the lower ramp component 98, and the actuator 48 axially expands. Specifically, the components of the upper ramp component 94 and the lower ramp component 98 axially expand apart relative to another, which in turn causes the entire actuator 48 to axially expand. The expansion of the actuator 48 in the axial direction causes the biasing elements 50 to compress, thereby increasing the torque of the pulley assembly 16 for isolation from torsional vibrations or excitations. The spring rate of the biasing members 50 may be varied in order to match the specific requirements of a system. Moreover, the ramp or angle of the first inclined features 114 of the upper ramp component 94 and the second inclined features 152 of the lower ramp component 98 may be modified to tailor and/or enhance the isolation characteristics of the alternator pulley assembly 16.

Interposed radially between an outer surface 160 of the hub 40 and the inner surface 158 of the lower ramp component 98 is the one-way clutch mechanism 44. The one-way clutch mechanism 44 is an annular clutching element that radially surrounds the hub 40. In the non-limiting embodiment as shown in FIGS. 2-3, the one-way clutch mechanism 44 is illustrated as an sprag bearing, and in particular a one-way needle bearing. However, it is to be understood that any type of one-way clutch mechanism for transmitting torque from the pulley body 62 to the hub 40 in only one direction of rotation may be used as well. For example, the one-way clutch mechanism 44 may be a wrap spring or a pawl clutch. As seen in FIGS. 2-3, the one-way clutch mechanism 44 includes an outer surface 170 that radially surrounds and engages with the inner surface 158 of the lower ramp component 98 for rotation therewith. The one-way clutch mechanism 44 also includes a plurality of one-way roller bearings or sprags 172 that contact the outer surface 160 of the hub 40.

Figure 4:
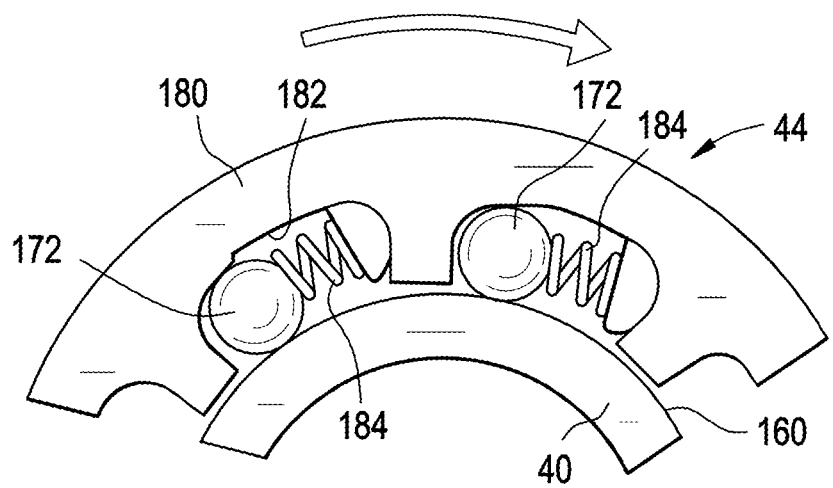
FIG. 4 is an enlarged, cross-sectioned view of the one-way clutch mechanism shown in FIG. 2, in an engaged position.

The one-way clutch mechanism 44 includes a torque transmitting or engaged position as well as a disengaged position. The engaged position corresponds to the pulley assembly 16 rotating in the predominate rotational direction. FIG. 4 is an illustration of the one-way clutch mechanism 44 activated into the engaged position, where the sprags 172 are in wedging engagement with the outer surface 160 of the hub 40. Specifically, the one-way clutch mechanism 44 may include an outer race 180 that includes a plurality of recesses 182. Each recess 180 may be sized to house a biasing element 184 and one of the sprags 172. When the outer race 180 of the one-way clutch 44 is rotated in the clockwise or predominate rotational direction the biasing elements 182 are activated. When activated, each of the biasing elements 182 urge a respective sprag 172 in a direction opposite the predominate rotational direction. Thus, each sprag 172 is in wedging engagement with the outer surface 160 of the hub 40, and the hub 40 may rotate in concert with the one-way clutch mechanism 44.

Figure 5:
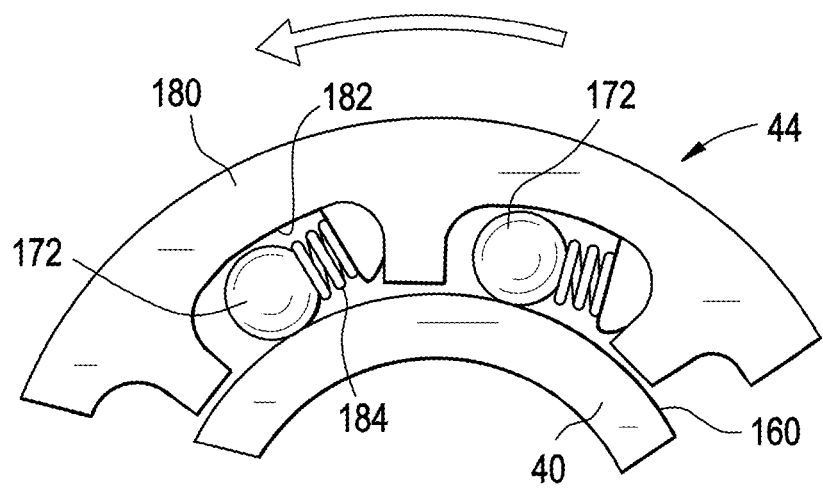
FIG. 5 is an enlarged, cross-sectioned view of the one-way clutch mechanism shown in FIG. 2, in a disengaged position.

FIG. 5 is an illustration of the one-way clutch mechanism 44 in the disengaged configuration, where the sprags 172 may be moved out of wedging engagement with the outer surface 160 of the hub 40. Specifically, when the outer race 180 of the one-way clutch 44 is rotated in a counterclockwise direction that is opposite the predominate rotational direction, the biasing elements 184 retract, and each sprag 172 is released from the outer surface 160 of the hub 40. Thus, the sprags 172 may slip or free-wheel with respect to the outer surface 160 of the hub 40, and the hub 40 may rotate freely with respect to the one-way clutch mechanism 44.

Referring generally to FIGS. 1-5, the alternator pulley assembly 16 may transfer input torque from the belt 30 (shown in FIG. 1) to the input shaft 32 of an accessory, such as the alternator, when rotated in a predominate rotational direction. Specifically, as the pulley body 62 is rotated in the predominate rotational direction, the one-way clutch mechanism 44 is in the engaged position, and the one-way clutch mechanism 44 may transfer torque between the pulley body 62 and the hub 40. Thus, the alternator pulley assembly 16 may transfer input torque from the belt 30 to the input shaft 32.

The alternator pulley assembly 16 also isolates the input shaft 32 from relative torque reversals. Specifically, if the pulley body 62 is rotated in a second rotational direction that is opposite the predominate rotational direction, then the one-way clutch mechanism 44 is in the disengaged position (shown in FIG. 5). Thus, the sprags 172 of the one-way clutch mechanism 44 may free-wheel with respect to the outer surface 160 of the hub 40, and the input shaft 32 disengages from the pulley assembly 16, and in particular from the pulley body 62. Therefore, during an overrunning condition, the input shaft 32 may continue to rotate with momentum in the predominate direction, while the pulley body 62 may experience a relative torque reversal or sudden slowdown. In this condition, the pulley body 62 may continue to rotate in the predominate rotational direction, but with less angular velocity when compared to the velocity at which the pulley body 62 had previously been driving the input shaft 32. Thus, the pulley body 62 is uncoupled from the hub 40, and the hub 40 and the pulley body 62 may rotate relative to one another such that the input shaft 32 rotates independently of the pulley body 62.

In the embodiments as shown in FIGS. 2-3, the one-way clutch mechanism 44 is radially interposed between the outer surface 160 of the hub 40 and the inner surface 158 of the lower ramp component 98. However, it is to be understood that the one-way clutch mechanism 44 may also be radially interposed between the pulley body 62 and the lower ramp component 98. Specifically, FIGS. 6-7 illustrate an alternative embodiment of a pulley assembly 316, where a one-way clutch mechanism 344 is interposed between a pulley body 362 and a lower ramp component 398. The pulley assembly 316 includes a hub 340 that is engageable with an input shaft 332, a spacer 342, a roller bearing 343, the one-way clutch mechanism 344, a clutch actuator 348, one or more biasing members 350, a sleeve 352, a retaining ring 354, and a plug 356, which are all housed within a bore 360 of the pulley body 362. The hub 340 may be mated to the input shaft 332 to prevent the hub 340 from freely rotating about the input shaft 332. The roller bearing 343 may include an inner race 364 and an outer race 366. As seen in FIG. 7, the roller bearing 343 may be located between the hub 340 and the pulley body 362.

As illustrated in FIGS. 6 and 7, the pulley body 362 includes an outer, peripheral belt-engaging surface 370 that engages the belt 30 (FIG. 1). The roller bearing 343 may support a portion of the force exerted by the endless belt 30 (shown in FIG. 1) upon the pulley body 362. A bushing 368, which is press-fit into a recess 369 located within the sleeve 352, may be used to support the remaining force exerted by the endless belt 30 that is not supported by the roller bearing 343. However, it should be noted that if the roller bearing 343 is aligned with the belt 30, then the roller bearing 343 may support the entire force exerted by the endless belt 30, and the bushing 368 may be omitted.

The sleeve 352 may include an outer surface 380. A portion or the entire outer surface 380 of the sleeve 352 may be knurled in order to grip or frictionally engage with an inner surface 386 of the pulley body 362, thereby fixing the sleeve 352 with the pulley body 362 for rotation therewith. The sleeve 352 may also define a recess 404 that receives a portion of the biasing members 350.

Similar to the embodiment as described above and illustrated in FIGS. 2-3, the clutch actuator 348 may include a ramp construction that expands axially as a result of rotational movement of at least a portion of the clutch actuator 348 as the pulley body 362 rotates in the predominate rotational direction. The clutch actuator 348 includes the upper ramp component 394, the lower ramp component 398, and a roller element 400 enclosed therebetween. The upper ramp component 394 is generally located adjacent to the biasing members 350. The lower ramp component 398 is located between the upper ramp component 394 and a thrust bearing 402. In the embodiment as shown in FIGS. 6-7, the lower ramp component 398 may be generally-cup shaped, and includes an outer wall 406. The lower ramp component 398 may be sized to receive at least a portion of the upper ramp component 394 therein.

The upper ramp component 394 may include a generally smooth upper surface 410, a lower surface 412 comprising one or more first inclined features 414 that are recessed into a body 416 of the upper ramp component 394, and an inner surface 418 defining a bore 420 for receiving the hub 340. The bore 420 of the upper ramp component 394 may include a plurality of coupling features 396 that are configured to engage with a series of axially extending splines 399 located on the hub 340. Thus, the upper ramp component 394 may slide in the axial direction along the hub 340. However the hub 340 and the upper ramp component 394 rotate in concert together with one another.

The first inclined features 414 of the upper ramp component 394 define a channel within which one of the roller elements 400 is seated. The channel has a first end 440 that is shallow relative to a second end 442 (i.e., the second end 442 is recessed more deeply into the body 416 of the upper ramp component 394).

The lower ramp component 398 has an upper surface 450. The outer wall 406 of the lower ramp component 398 surrounds the upper surface 450. The upper surface 450 may include one or more second inclined features 452 recessed into a body 454 of the lower ramp component 398, a generally smooth lower surface 456, and an inner surface 458 defining a bore 460. The bore 460 of the lower ramp component 398 receives the hub 340. The thrust bearing 402 may be seated between the lower surface 456 of the lower ramp component 398 and an inner surface 464 of the pulley body 362 (shown in FIG. 7). In one embodiment the thrust bearing 402 may be a roller-type thrust bearing including a plurality of generally cylindrical roller elements 462.

Referring to FIG. 6, the second inclined features 452 of the lower ramp component 398 may be similarly constructed to those in the upper ramp component 394, except that an orientation of a first end 464 and a second end 466 of the second inclined features 452 may be reversed relative to the orientation of the first and second ends 440, 442 of the first inclined features 414. The biasing members 350 may compress as the components expand, in particular, as the upper ramp component 394 and the lower ramp component 398 axially expand apart relative to another. The compression of the biasing elements 350 increase the torque of the pulley assembly 316 for isolation.

Interposed between the inner surface 386 of the pulley body 362 and an outer surface 468 of the lower ramp component 398 is the one-way clutch mechanism 344. Similar to the embodiment as shown in FIGS. 2-3, the one-way clutch mechanism 344 is illustrated as a sprag bearing, and in particular a one-way needle bearing. However, it is to be understood that any type of one-way clutch mechanism for transmitting torque from the pulley body 362 to the hub 340 in only one direction of rotation may be used as well. The one-way clutch mechanism 344 includes an outer surface 470 that is engaged with the inner surface 386 of the pulley body 362 for rotation therewith. The one-way clutch mechanism 344 also includes a plurality of one-way roller bearings or sprags 472 that contact the outer surface 468 of the lower ramp component 398.

Similar to the embodiment as shown in FIGS. 2-5, the one-way clutch mechanism 344 includes an engaged configuration as well as a disengaged configuration. When the one-way clutch mechanism 344 is in the engaged configuration, the pulley body 362 rotates in the predominate rotational direction, and the sprags 472 of the one-way clutch mechanism 344 are in wedging engagement with the outer surface 468 of the lower ramp component 398. The lower ramp component 398 acts to drive the upper ramp component 394. As discussed above, the hub 340 and the upper ramp component 394 are keyed to one another and rotate together. Thus, as the pulley body 362 rotates in the predominate rotational direction, the lower ramp component 398 drives the upper ramp component 394, and the upper ramp component 394 drives the hub 340. Therefore, the hub 340 rotates with the pulley body 362.

When the one-way clutch mechanism 344 is in the disengaged configuration, the sprags 472 may slip or free-wheel against the outer surface 468 of the lower ramp component 398. Thus, the hub 340 may rotate freely with respect to the one-way clutch mechanism 344. Similar to the embodiment as shown in FIGS. 2-5, the alternator pulley assembly 316 may transfer input torque from the belt 30 (shown in FIG. 1) to the input shaft 332 of an accessory, such as the alternator, when rotated in a predominate rotational direction. The alternator pulley assembly 316 also isolates the input shaft 332 from relative torque reversals. Specifically, if the pulley body 362 is rotated in a second rotational direction that is opposite the predominate rotational direction, then the one-way clutch mechanism 344 is in the disengaged position. Thus, the sprags 472 of the one-way clutch mechanism 344 may free-wheel with respect to the outer surface 468 of the lower ramp component 398. Therefore, during an overrunning condition, the input shaft 332 may continue to rotate with momentum in the predominate direction, while the pulley body 362 may experience a relative torque reversal or sudden slowdown.

Referring generally to FIGS. 1-7, the disclosed pulley assemblies 16, 316 utilize a radially oriented decoupling mechanism (i.e., the one-way clutching mechanism 44, 344) for allowing one-way relative motion between the input shaft and the outer driven sheave of the pulley assembly. The available amount of packaging space in the engine compartment of many vehicles may be limited. This issue may be further exacerbated by utilizing relatively large under hood components, such as the alternator. The disclosed pulley assemblies may have a reduced height when compared to some other types of pulley assemblies that utilize a friction clutch. Thus, the disclosed pulley assemblies may be especially beneficial in applications where packaging space in the engine compartment of a vehicle is extremely limited. In addition to a reduced amount of packaging space, the disclosed pulley assemblies may generate a reduced amount of noise, heat, more consistent overrun torque, and fewer torque spikes when compared to some other types of pulley assemblies that may utilize friction clutches.

The embodiments of this invention shown in the drawings and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom will be limited only by the scope of the appended claims.

What is claimed is:

1. A pulley assembly, comprising:
   a pulley body having a bore therethrough, the pulley body rotatable in a predominate direction;
   a hub defining an axis of rotation and having an outer surface, wherein the hub is disposed within the pulley body;
   a one-way clutch mechanism radially surrounding the hub, the one-way clutch mechanism including an engaged position and a disengaged position, wherein the hub and the pulley body rotate together in the predominate direction if the one-way clutch mechanism is in the engaged position, and wherein the hub freely rotates with respect to the pulley body if the one-way clutch mechanism is in the disengaged position: and
   a clutch actuator having an inner surface, an upper ramp component and a lower ramp component, wherein the one-way clutch mechanism is interposed between the outer surface of the hub and the inner surface of the clutch actuator, and wherein the lower ramp component includes the inner surface that surrounds the one-way clutch mechanism.

2. The pulley assembly of claim 1, wherein the upper ramp component drives the lower ramp component.

3. The pulley assembly of claim 1, wherein the clutch actuator is disposed around the hub.

4. The pulley assembly of claim 3, wherein the upper ramp component and the lower ramp component axially expand with respect to one another if the pulley body rotates in the predominate rotational direction.

5. The pulley assembly of claim 3, further comprising at least one biasing element for exerting a force in an axial direction against the upper ramp component.

6. The pulley assembly of claim 3, wherein the hub and the upper ramp component are keyed to one another.

7. The pulley assembly of claim 3, further comprising at least one roller element disposed between the upper ramp component and the lower ramp component.

8. The pulley assembly of claim 1, wherein the one-way clutch mechanism is one of a sprag bearing, a wrap spring and a pawl clutch.

9. A pulley assembly, comprising:
   a pulley body having a bore therethrough, the pulley body rotatable in a predominate direction;
   a hub defining an axis of rotation, wherein the hub is disposed within the pulley body;
   a clutch actuator disposed around the hub, wherein the clutch actuator includes an upper ramp component and a lower ramp component, wherein the upper ramp component and the lower ramp component axially expand with respect to one another if the pulley body rotates in the predominate rotational direction, and wherein the hub and the upper ramp component are keyed to one another; and
   a one-way clutch mechanism radially surrounding the hub, the one-way clutch mechanism including an engaged position and a disengaged position, wherein the hub and the pulley body rotate together in the predominate direction if the one-way clutch mechanism is in the engaged position, and wherein the hub freely rotates with respect to the pulley body if the one-way clutch mechanism is in the disengaged position.

10. The pulley assembly of claim 9, wherein the one-way clutch mechanism is interposed between an outer surface of the hub and an inner surface of the lower ramp component of the clutch actuator.

11. The pulley assembly of claim 10, wherein the upper ramp component drives the lower ramp component.

12. The pulley assembly of claim 9, wherein the one-way clutch mechanism is interposed between an inner surface of the pulley body and an outer surface of the lower ramp component of the clutch actuator.

13. The pulley assembly of claim 12, wherein the lower ramp component drives the upper ramp component of the clutch actuator.

14. The pulley assembly of claim 9, further comprising at least one biasing element for exerting a force in an axial direction against the upper ramp component of the clutch actuator.

15. A pulley assembly, comprising:
a pulley body having a bore therethrough and an inner surface, the pulley body rotatable in a predominate direction;
a hub defining an axis of rotation, wherein the hub is disposed within the pulley body;
a one-way clutch mechanism radially surrounding the hub, the one-way clutch mechanism including an engaged position and a disengaged position, wherein the hub and the pulley body rotate together in the predominate direction if the one-way clutch mechanism is in the engaged position, and wherein the hub freely rotates with respect to the pulley body if the one-way clutch mechanism is in the disengaged position; and
a clutch actuator having an outer surface, an upper ramp component and a lower ramp component, wherein the one-way clutch mechanism is interposed between the inner surface of the pulley body and the outer surface of the clutch actuator, and wherein the lower ramp component includes the outer surface.

16. The pulley assembly of claim 15, wherein the lower ramp component drives the upper ramp component.

17. A pulley assembly, comprising:
a pulley body having a bore therethrough, the pulley body rotatable in a predominate direction;
a hub defining an axis of rotation, wherein the hub is disposed within the pulley body;
a one-way clutch mechanism radially surrounding the hub, the one-way clutch mechanism including an engaged position and a disengaged position, wherein the hub and the pulley body rotate together in the predominate direction if the one-way clutch mechanism is in the engaged position, and wherein the hub freely rotates with respect to the pulley body if the one-way clutch mechanism is in the disengaged position; and
a clutch actuator disposed around the hub, the clutch actuator including an upper ramp component and a lower ramp component, wherein the hub and the upper ramp component are keyed to one another.

* * * * *